United States Patent [19]
Hitze et al.

[11] 3,867,553
[45] Feb. 18, 1975

[54] PROCESS FOR REDUCING THE BOILING TIME OF DEHYDRATED PEAS

[75] Inventors: Winfried Hitze; Karla Legler, both of Heilbronn; Rolf Stute; Hans-Ulrich Woelk, both of Flein, all of Germany

[73] Assignee: CPC International Inc., Englewood Cliffs, N.J.

[22] Filed: Apr. 11, 1973

[21] Appl. No.: 350,266

[52] U.S. Cl.................. 426/44, 426/46, 426/50, 426/460
[51] Int. Cl............................... D23b 7/02
[58] Field of Search......... 426/44, 46, 50, 455, 456, 426/459, 460; 195/4, 5, 2

[56]   References Cited
UNITED STATES PATENTS
3,183,102   5/1965   Malecki.............................. 426/46
3,258,407   6/1966   Blanchon............................ 426/53
3,640,723   2/1972   Uhlig.................................. 426/46

OTHER PUBLICATIONS
Chemical Abstracts, Nov. 1966, Vol. 65, p. 15995H.
Dixon, Webb, Enzymes, Second Edition, Academic Press Inc., New York, 1964, p. 742.

*Primary Examiner*—Samih N. Zaharna
*Assistant Examiner*—Ernest G. Therkorn
*Attorney, Agent, or Firm*—Salvatore C. Mitri; Frank E. Robbins; Janet E. Price

[57]         ABSTRACT

Dehydrated peas which can be rehydrated for consumption by boiling for only 10–15 minutes are prepared by first treating the peas in aqueous medium with a pectolytic enzyme at a temperature of less than 60°C. The peas are subsequently cooked in the dehydration process, the cooking step inactivates the enzyme, and the product is finally dried.

3 Claims, No Drawings

PROCESS FOR REDUCING THE BOILING TIME OF DEHYDRATED PEAS

BACKGROUND OF THE INVENTION

This invention relates to a process for reducing the boiling time necessary to cook dehydrated peas, in which the shape, structure, color and taste of the peas are largely preserved.

The production of pulses (edible leguminous seed such as peas, beans, lentils, etc.) with a long shelf life, which will cook fast after drying, has been the object of investigation by those concerned with food technology. The specific problem involved in the development of suitable dehydration processes is to achieve a reduced boiling time or fast softening of the pulses, e.g., peas, steps must be taken to insure that the shape, color and taste of the peas are preserved. Chemical treatment using phosphates, polyhydric alcohols, and sodium citrate have failed to deal with this problem in a satisfactory manner.

It has been suggested that reduced boiling times may be achieved by altering the dehydration process as follows. After the precooking phase and immediately before drying, the pulses are treated with proteolytic enzymes such as papain. Apart from the fact that proteolytic enzymes inevitably produce an adverse effect on the pulse proteins, which are key components from a nutritional and physiological point of view, their activity extends the drying process in a way that is not easily controlled since the enzymes should be sprayed on the pulse after precooking. Hence, it is necessary to select a drying process which will insure a more or less complete and rapid inactivation of the proteases and of any other microorganisms that may have been brought in at the same time.

Since the impermeability of the husks has been felt to be the main cause of the long boiling times required for softening dehydrated peas, further efforts have been made to modify the husks so as to permit sufficient water uptake for a brief boiling time. Among the relevant methods are those providing for a "perforation" of the husks by means of mechanical forces. The pulse is passed through mechanical devices, such as rolls equipped with pins, or drying conditions, vacuum and drying speed are selected so as to insure a bursting of the husks.

None of these methods has yielded any technical and economic success due to the fact that sometimes other properties of the pulse are seriously changed in the process and that the reduction in boiling time is reversed when the pulse being treated, for instance, with chemicals is boiled long with components, such as spices, starch or other binders, vegetables etc., which are normal adjuncts to a pulse preparation. Interractions with the calcium ions of the water used for boiling may bring about a modification of the forcibly accomplished permeability of the husks so that the water uptake is delayed and the boiling time prolonged.

An irreversible change of the husks may also be caused when using enzymes capable of decomposing cellulose and/or hemicellulose. But it is difficult to control the decomposition process in a way insuring that no serious changes are produced in the texture of the coat and interior of the seed. A method of husking soy beans by treating them with a solution which is obtained by cultivating cellulase producing microorganisms and may contain pectinase thus prove to be unsuitable for reducing the boiling time of dehydrated peas. This treatment of peas with cellulytic enzymes provides maximum husking when the pH is adjusted to an optimal level of 4.0 by means of addition of glacial acetic acid. Under these conditions extensive changes in the shape, structure and notably the taste of the peas occur.

It is an object of the invention to provide a process for pretreating peas that are to be dehydrated that improves the rehydration boiling time of the peas. It is a further object of the invention to preserve the shape, structure, color and taste of the peas when rehydrated. It is also an object of the invention to provide a process to prepare dehydrated peas useful in dry soup mixes and in other dehydrated convenience food items.

SUMMARY OF THE INVENTION

We have found that a surprising reduction of the boiling time necessary to cook dehydrated peas can be achieved while largely preserving the shape, structure, color and taste of such peas by placing the peas in an aqueous suspension at room temperature or at an elevated temperature of up to about 50°C and treating the slurry with pectolytic enzymes. The pectolytic enzymes should have a high content of polymethylgalacturonases and polygalacturonases and should be largely free from cellulytic enzymes.

Treating the peas with the pectolytic enzymes causes the pectins, which can be regarded as the intercellular cementing substances for the palisade cells forming the husk, to decompose to an extent which makes the husks sufficiently and irreversibly permeable to water and provides for faster rehydration and softening of the husks. As a result the boiling time necessary to cook the peas which normally is about 25 minutes is reduced to about 10–15 minutes. It should be noted that the overall structure of the peas is not unfavorably changed by the treatment with pectolytic enzymes. Table I exemplifies figures reflecting the accelerated uptake of water by enzymatically treated dehydrated peas.

TABLE I

| Time (min.) | % water uptake untreated peas | % water uptake treated peas |
| --- | --- | --- |
| 5 | 44–46 | 51–53 |
| 10 | 50–56 | 63–65 |

The final state of water absorption is reached about 10 minutes earlier in the peas treated with pectolytic enzymes than in the untreated peas.

The use of pectolytic enzymes precludes any adverse effect on the pea proteins which play a key role from a nutritional and physiological point of view. It is a particular advantage of the invention that it permits the treatment of the peas with pectolytic enzymes to be combined with the soaking process (preparation) usually preceding drying. Hence, the process of the invention may be carried out on the normally existing dehydration equipment with no further extra investments required.

By choosing a proper enzyme concentration it is even possible to omit the adjustment of the pH by adding acids or alkali which would impair the tastes of the peas treated. Finally, the reduction in boiling time achieved through the new process is irreversible and independent of the other components present in the preparation (soup), such as thickeners, vegetables or calcium ions of the water used.

It is contemplated that treatment with pectolytic enzymes may take place in the presence of substances normally used in pea dehydration, such as polyols, any type of sugar, complexing agents and salts, and the slurry may be stirred if desired. In a preferred embodiment the invention provides a method for inactivating the pectolytic enzymes, prior to the drying of the treated peas, in a subsequent boiling process. Accordingly, the enzymes are inactivated by the boiling process normally following the soaking phase so that the activity of the enzymes and the subsequent inactivation takes place under conditions permitting rigid and simple control.

To illustrate the manner in which the invention may be carried out, the following examples are given.

EXAMPLE I 50 kg of green peas are added to 125 l of soaking water, 3–7° hardness (German standard) which contains 0.5 percent (referred to the quantity of peas) of the enzyme preparation Pektinol B 20 (Rohm & Haas G.m.b.H., Darmstadt) which decomposes preferably pectin, and are left to soak for 20 hours at room temperature. The water is then drained off and the moist peas are cooked in streaming steam at about 110°C, whereupon they are exposed to air for cooking and subsequently placed on a belt-type dryer to be dried in an air current at between 50° and 90°C to a moisture content of 9.5 percent.

Organoleptic evaluation showed the boiling time of the peas so treated to be 12 minutes. Peas which had been treated in the same manner but in the absence of enzymes required about 25 minutes of boiling to reach the same degree of softness.

EXAMPLE II 50 kg of green peas are added to 140 l of soaking water which apart from the enzyme as per Example I contains 0.5 percent of potassium citrate, referred to water, and are left to soak for 20 hours at room temperature. After the water has been drained off, the moist peas are boiled in streaming steam at about 110°C and subsequently kiln-dried at temperatures from about 50 to about 55°C until a moisture content of 10 percent is reached.

Organoleptic evaluation showed the boiling time of the peas so treated to be 8 minutes. Peas which had been treated in the same manner but in the absence of enzymes required about 18 minutes of boiling to reach the same degree of softness.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

We claim:

1. The process for preparing dehydrated whole peas having a reduced rehydration time comprising the steps of
   suspending the peas in an aqueous solution, treating the suspended peas with pectolytic enzymes, which have a high content of polymethylgalacturonases and polygalacturonases and are largely free from cellulytic enzymes, while maintaining the solution temperature in the range from about 15°C to about 50°C,
   elevating the solution temperatures to the boiling point to inactivate the enzymes and decompose the pectins contained in the husks of said peas to an extent such that the husks are sufficiently and irreversibly permeable to water and provide faster rehydration and softening of said husks,
   cooking the peas in solution, and
   drying the peas to a state of dehydration.

2. The process as set forth in claim 1 wherein the steps of suspending the peas and of enzyme treatment proceed coincidentally.

3. The process as set forth in claim 1 wherein the enzyme inactivation step and the cooking step proceed coincidentally.

* * * * *